A. MAIRE.
APPARATUS FOR MEASURING THE HARDNESS OF BODIES.
APPLICATION FILED OCT. 31, 1918.
1,385,182.
Patented July 19, 1921.
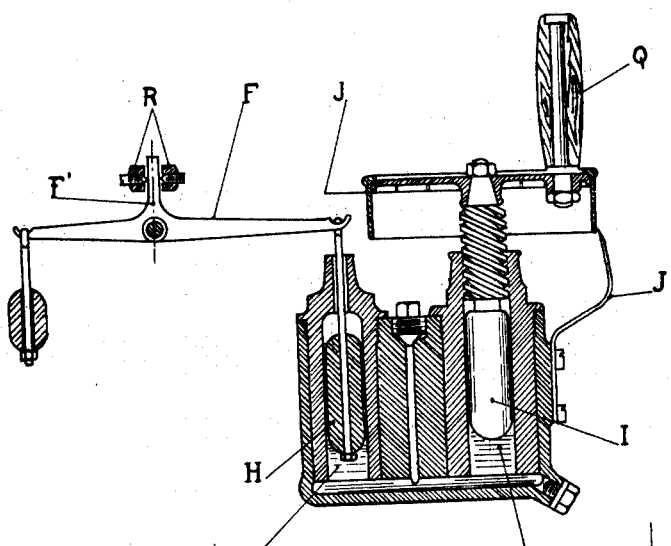
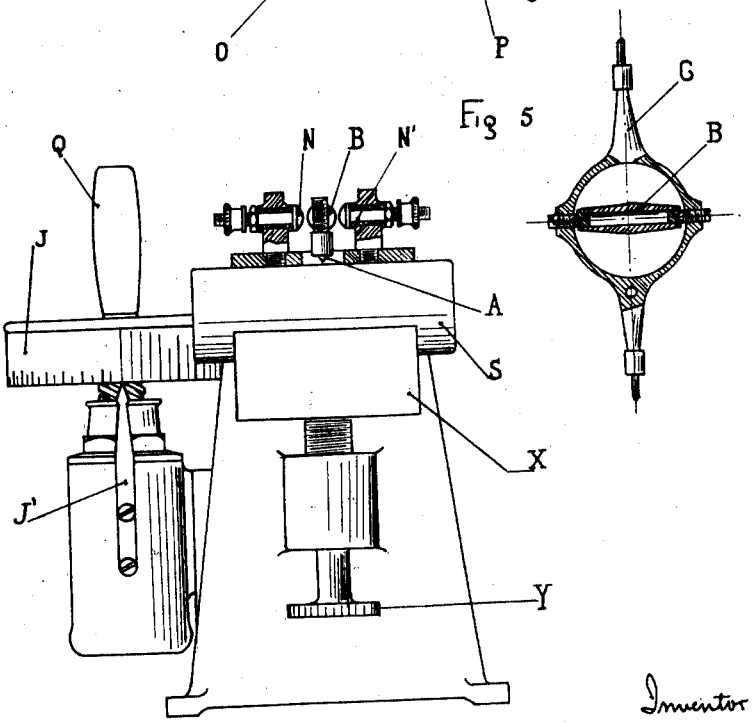

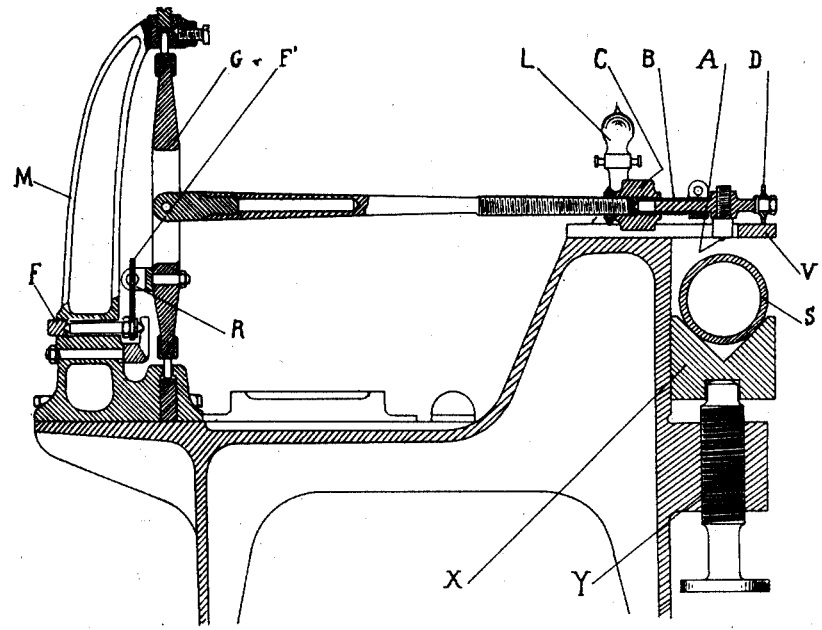
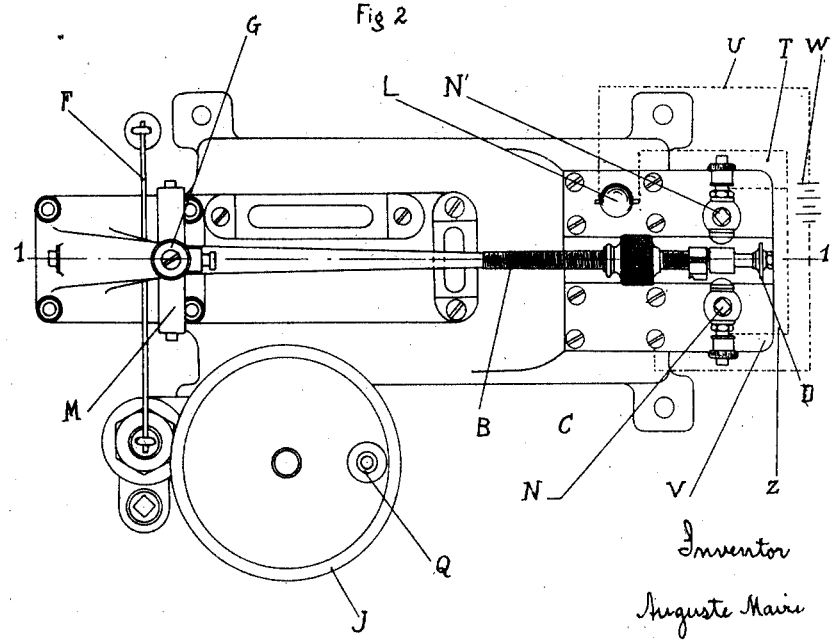

UNITED STATES PATENT OFFICE.

AUGUSTE MAIRE, OF ARGENTEUIL, FRANCE, ASSIGNOR TO SOCIETE LORRAINE DES ANCIENS ETABLISSEMENTS DE DIETRICH & CIE. DE LUNEVILLE, OF PARIS, FRANCE.

APPARATUS FOR MEASURING THE HARDNESS OF BODIES.

1,385,182.

Specification of Letters Patent.   Patented July 19, 1921.

Application filed October 31, 1918.  Serial No. 260,499.

*To all whom it may concern:*

Be it known that I, AUGUSTE MAIRE, citizen of the Republic of France, residing at Route de Bezons, Argenteuil, Seine and Oise, in the Republic of France, have invented new and useful Improvements in Apparatus for Measuring the Hardness of Bodies, of which the following is a specification.

This invention has for its object an apparatus for measuring the hardness of bodies and particularly of cemented pieces, and is characterized by the fact that the measure is effected by determining the strain which is necessary to cause the displacement of a diamond which scratches the body to be verified.

The accompanying drawings illustrate an embodiment of the said apparatus by way of example.

Figure 1 is a longitudinal vertical section of the said apparatus, taken on line 1—1 of Fig. 2;

Fig. 2 is a plan view thereof;

Fig. 3 is a vertical section view of the device for causing the displacement of the diamond holding lever and for measuring the strain required for the said displacement;

Fig. 4 is a partial end view of the said apparatus;

Fig. 5 represents a detail of the mounting for the said diamond holding lever.

In reference to the drawings, it will be noted that the said apparatus essentially comprises a diamond A set in any suitable manner on a lever B of any very light construction and provided at its front end with a block C for loading the diamond and a roller D, the latter, when at rest, bearing on the plate V. At its rear end, the lever B is connected with the support M by means of a universal joint, so that the said diamond may, if necessary, be moved in a vertical plane and also in a horizontal plane; the said universal joint is constituted by a collar G to which is jointed the lever B (Figs. 1 and 5) and itself pivoted to the support M.

The movement of the lever B in the horizontal plane is controlled by a balance comprising a double lever F on which are hung two weights, one of which, designated H in Fig. 3, is movable in a container O which communicates with a chamber P containing quicksilver and wherein is a plunger I provided with a threaded portion and which will move vertically when the drum J is rotated by means of the handle Q. The lever F will act on the lever B by means of the arm F' engaging the fork R integral with the collar G.

The piece S, the hardness of which is to be measured, is placed on to the block X and brought into contact with the lower side of the plate V by turning the screw Y; in this position of the piece S, the diamond is raised and the roller D no longer bears on the plate V.

For effecting the measure, care must previously be taken to force quicksilver into the container O by depressing the plunger I, so as to completely relieve the counterweight H. The apparatus is so adjusted that, as the said counterweight is relieved, the diamond holder will move toward and contact against the terminal N insulated from the framework. The said terminal N is connected by a conductor T (Fig. 2) with one contact of a lamp L, the other contact of which is connected by the conductor U with an element battery W connected on the other hand with the framework by the conductor Z. By contacting with the terminal N, the lever B will cause the lamp L to be brought into circuit with the framework, and also the lighting thereof. The index J' will then indicate a definite graduation on the drum J.

By rotating the said drum in the contrary direction, the plunger I will move upwardly through the chamber P and the mercury will sink through the container O. This will give rise to a feeding couple or impulse which, as soon as the same has reached a sufficient value, will cause the motion of the diamond. At the precise moment this motion begins, the contact between the diamond holder and the terminal N is broken and the lamp L being insulated from the framework, is extinguished. By reading the graduation which is then in front of the index J', the hardness of the piece is deduced comparatively.

If desired, the rotation of the drum J may be continued so as to cause the diamond to travel the entire distance between the terminal N and the terminal N', which latter is also insulated from the framework and connected with the lamp L. As soon as the diamond holder contacts with the said terminal N′, the lamp L is lighted again and the reading on the drum J will then give a new figure which may serve to verify the first one.

Having now described my invention, what I claim as new and desire to secure by Letters Patent is:

1. An apparatus for measuring the hardness of a stationary body comprising in combination a diamond, a pivotally mounted supporting member upon which said diamond is rigidly secured, means for moving bodily said pivoted supporting member and the diamond with a progressively increasing force so as to tend to move the diamond across the surface of the stationary body and means for measuring the variable value of said force.

2. An apparatus for measuring the hardness of a body, comprising in combination: a diamond, means for applying the said diamond against the body under a light pressure, a weight under the action of gravity, means for connecting the said weight with the diamond, a mass of liquid wherein the weight is adapted to float, a device for varying the level of the said liquid mass and means in connection with the said device and adapted to indicate the impulse or feeding strain which is exerted by the weight upon the diamond and tends to move the diamond across the surface of the body.

3. An apparatus for measuring the hardness of a body, including in combination: a diamond, means for applying the said diamond against the body under a light pressure, a weight under the action of gravity and adapted to move the diamond across the surface of the body, means for connecting the said weight with the said diamond, a container, a mass of liquid in the said container and wherein the weight is adapted to float, a pump cylinder connected with the said container, a plunger axially movable through the said pump cylinder, an actuating rotating organ having graduations thereon, and means connecting the said actuating rotating organ with the plunger and by means of which the rotary motion of the said organ imparts to the plunger an axial motion in the said pump cylinder.

4. An apparatus for measuring the hardness of a body, including in combination: a diamond, a lever holding the said diamond, means for applying the said diamond against the body under a light pressure, a support for the diamond holding lever, whereby the diamond may be brought into contact with the body to be tried, a crank lever connected with the said diamond holding lever, a weight connected with the said crank lever, a container, a liquid mass in the said container and wherein the said weight is adapted to float, a pump cylinder connected with the said container, a plunger axially movable through the said pump cylinder, an actuating rotating organ having graduations thereon, and means connecting the said rotating organ with the plunger and whereby the rotary motion of the rotating organ imparts to the said plunger an axial motion through the pump cylinder.

5. An apparatus for measuring the hardness of a body, comprising in combination: a diamond, a diamond holding lever, means for applying the said diamond against the body under a light pressure, a support for the diamond supporting lever, whereby the diamond may be brought into contact with the body to be tried, a crank lever connected with the said diamond holding lever, a weight connected with the said crank lever, a container, a liquid mass in the said container and wherein the said weight is adapted to float, a pump cylinder connected with the said container, a plunger axially movable through the said pump cylinder, an actuating rotating organ having graduations thereon, means connecting the said rotating organ with the plunger and whereby the rotary motion of the rotating organ imparts to the said plunger an axial motion through the pump cylinder, an electrical lamp, a source of current and a circuit connecting the lamp with the said source of current, the said circuit having a fixed and a movable contact, coöperating, mounted upon the diamond holding lever.

6. An apparatus for measuring the hardness of a body, comprising in combination: a diamond, a diamond holding lever, a weight adjustable upon the said lever, horizontal studs about which the lever may freely turn, a part supporting the said horizontal studs, a support whereon the said part may turn about a vertical axis, a crank lever having a vertical arm connected with the said part and a horizontal arm, a weight hung upon the said horizontal arm, a container, a liquid mass held in the said container and wherein the said weight is adapted to float, a pump cylinder connected with the said container, a plunger axially movable through the said pump cylinder, an actuating rotating organ having graduations thereon, and means connecting the said rotating organ with the plunger and whereby the rotary motion of the rotating organ imparts to the said plunger an axial motion through the pump cylinder.

In testimony whereof I have signed my name to this specification.

AUGUSTE MAIRE.